US009829866B2

(12) United States Patent
Ruth

(10) Patent No.: US 9,829,866 B2
(45) Date of Patent: Nov. 28, 2017

(54) METHOD AND APPARATUS FOR AUTOMATICALLY CREATING AN EXECUTABLE SAFETY FUNCTION FOR A DEVICE

(75) Inventor: Olaf Ruth, Blomberg (DE)

(73) Assignee: Phoenix Contact GMBH & Co. KG, Blomberg (DE)

( * ) Notice: Subject to any disclaimer, the term of this patent is extended or adjusted under 35 U.S.C. 154(b) by 737 days.

(21) Appl. No.: 14/236,978

(22) PCT Filed: Jul. 30, 2012

(86) PCT No.: PCT/EP2012/064878
§ 371 (c)(1),
(2), (4) Date: Nov. 28, 2014

(87) PCT Pub. No.: WO2013/020852
PCT Pub. Date: Feb. 14, 2013

(65) Prior Publication Data
US 2015/0088286 A1    Mar. 26, 2015

(30) Foreign Application Priority Data
Aug. 10, 2011 (DE) .......................... 10 2011 109 888

(51) Int. Cl.
G06F 9/44   (2006.01)
G05B 9/02   (2006.01)
G05B 19/042 (2006.01)

(52) U.S. Cl.
CPC ........... *G05B 9/02* (2013.01); *G05B 19/0426* (2013.01); *G06F 8/35* (2013.01)

(58) Field of Classification Search
None
See application file for complete search history.

(56) References Cited

U.S. PATENT DOCUMENTS

| 5,805,797 A * | 9/1998 | Sato .................. B61L 3/008 714/48 |
| 5,950,150 A * | 9/1999 | Lloyd ................ A62C 37/50 340/506 |
| 6,442,441 B1 | 8/2002 | Walacavage et al. |

(Continued)

OTHER PUBLICATIONS

International Search Report of corresponding PCT application PCT/EP2012/064878.

(Continued)

*Primary Examiner* — Chameli Das
(74) *Attorney, Agent, or Firm* — Anderson Gorecki LLP

(57) ABSTRACT

A method for automatically creating an executable safety function for a device, includes the steps of collecting digital parameters which specify a particular safety function, determining a first check value on the basis of the digital parameters, automatically assigning a number of digital function modules from a plurality of predefined digital function modules to the collected digital parameters in order to obtain a safety function source code of the particular safety function, compiling the safety function source code in order to obtain the executable safety function, determining a second check value on the basis of the executable safety function, and outputting the executable safety function if the first check value and the second check value meet a verification criteria.

14 Claims, 8 Drawing Sheets

(56) References Cited

U.S. PATENT DOCUMENTS

| | | | | |
|---|---|---|---|---|
| 2004/0002794 A1* | 1/2004 | Pillar | ............... | A62C 27/00 701/1 |
| 2004/0218317 A1* | 11/2004 | Kawazu | ............... | G05B 19/058 361/1 |
| 2004/0230323 A1* | 11/2004 | Glanzer | ............... | G05B 9/02 700/18 |
| 2006/0242535 A1* | 10/2006 | Barthel | ............... | H04L 1/0061 714/758 |
| 2008/0004839 A1* | 1/2008 | Papadimitriou | ... | G01N 27/9046 702/182 |
| 2008/0155318 A1* | 6/2008 | Shelvik | ............... | G05B 19/0428 714/12 |
| 2009/0177290 A1* | 7/2009 | Nikolai | ............... | G05B 9/02 700/21 |
| 2011/0055564 A1* | 3/2011 | Porsch | ............... | H04L 9/3236 713/168 |
| 2011/0144866 A1* | 6/2011 | Maier | ............... | B60R 21/013 701/45 |
| 2012/0004744 A1 | 1/2012 | Reusch et al. | | |
| 2012/0036493 A1* | 2/2012 | Moosmann | ............... | G05B 9/03 717/105 |
| 2012/0239256 A1* | 9/2012 | Hammerschmidt | .. | H04L 1/0061 701/45 |
| 2012/0297101 A1* | 11/2012 | Neupartl | ............... | G05B 19/058 710/110 |

OTHER PUBLICATIONS

Andreas Svendsen et al: "The Future of Train Signaling", Sep. 28, 2008, Model Driven Engineering Languages and Systems pp. 128-142.

* cited by examiner

METHOD AND APPARATUS FOR AUTOMATICALLY CREATING AN EXECUTABLE SAFETY FUNCTION FOR A DEVICE

CROSS-REFERENCE TO RELATED APPLICATIONS

This application is a national phase application of PCT/EP2012/064878 the content of which is hereby incorporated herein by reference.

DESCRIPTION

The invention relates to the field of automation technology.

Modern automation technology systems are equipped with safety functions which are triggered in the event of safety-related events. One example of a safety function is an emergency stop of a machine. Safety functions of this type normally have an architecture which is defined by the DIN EN ISO 13849-1 standard. There, three function blocks S1, S2 and S3 are defined, which are set up and connected in series by means of safety-related application software. A first function block S1 relates to the input processing and is provided, for example, to carry out an equivalence evaluation of output signals of secure sensors. A second function block S2, which is provided for an intermediate processing, is connected downstream of the first function block S1. The intermediate processing is required when output signals of the input processing must not be connected directly to, for example, a hardware output or to the output processing. The intermediate processing can implement an emergency stop. A third function block S3, which is provided for the output processing, is connected downstream of the second function block S2. The output processing is required when function blocks are connected directly upstream of a hardware output of a device, for example External Device Monitoring (EDM) to control and monitor this output.

The function blocks S1 to S3 can be mapped in a secure programming interface through specific software modules. These modules can form part of existing secure programming interfaces. The secure programming interface is characterized in that it has measures for recognizing random errors and responds to this type of error in such a way that these errors do not result in safety-critical behaviors. Furthermore, this secure programming interface must have been created according to a development process which counteracts systematic errors.

For every safety function, the architecture described above is represented in graphical form, for example according to the DIN EN ISO 13849-1 standard. Each of the function blocks S1, S2, S3 contains a context menu in which the requirements are specified in the form of a, for example tabular, listing. The information supplied by the user to the context menu corresponds to the conventional specification information.

The safety function, which must normally be implemented by application software, must be specified and implemented, in particular, in relation to the requirements from the risk analysis. The following process steps P1 to P7 must currently be followed for this purpose.

P1: Specification of the safety-related application software,
P2: Verification of the specification,
P3: Production of the safety-related application software through coding,
P4: Verification of the safety-related application software by means of the so-called white box test,
P5: Creation of a black box test specification to validate the safety-related application software,
P6: Verification of the black box test specification,
P7: Validation of the safety-related application software on the basis of the black box test specification.

These process steps P1 to P7 must currently be organizationally planned and carried out manually by a user. However, this is complex and associated with an increased error probability.

The object of the present invention is therefore to produce a concept for the automatic creation of a safety function for a device.

This object is achieved by the features of the independent claims. Advantageous further development forms are set out in the dependent claims, in the description and in the drawings.

The present invention is based on the finding that a safety function can be created automatically for a device, for example in a secure programming environment, for example by means of application software, if protective layers which enable an automatic checking or verification of the safety function are already provided in the specification/creation of the safety function.

As a result, a process management function from the specification to the safety-related application software can be implemented automatically in a secure programming interface for functional safety applications in machinery and installations. Here, the specification part, for example digital software specifications, can be integrated into the secure software interface which may have, for example, context menus. From these details of the context menus, source codes can be created by the secure programming interface for each function block, and can be configured and manufactured for the entirely programmed and parameterized safety function.

According to one aspect, the invention relates to a method for the automatic creation of an executable safety function for a device, with inputting of digital parameters which specify a determined safety function, determination of a first check value on the basis of the digital parameters, automatic assignment of a number of digital function blocks from a plurality of predefined digital function blocks to the input digital parameters in order to obtain a safety function source code of the determined safety function, and compilation of the safety function source code in order to obtain the executable safety function, determination of a second check value on the basis of the executable safety function, and output of the executable safety function if the first check value and the second check value meet a verification criterion.

The executable safety function is, for example, executable by means of a processor or, generally, by means of a data processing system. The executable safety function can be created as application software which, when it is executed, supplies a program which implements the architecture model according to the DIN EN ISO 13849-1 standard. The executable safety function can be created at least partially automatically, i.e. without interaction with a user, on the basis of the digital specification information.

The digital parameters may be present in the form of digital values and may, for example, represent safety-related device parameters in relation to a required safety integrity of the safety function. The digital parameters may be the software connections of the device hardware to the function blocks, the logical connection between the function blocks, the function blocks themselves and parameters which characterize or parameterize the function blocks.

The first check value determined on the basis of the digital parameters may be determined in a first protective layer and may be derived for each safety function from the digital parameters themselves or from the digital parameters including the function blocks or their parameters.

The plurality of predefined digital function blocks may be stored in a digital function block library, such as a database. Through the automatic assignment, which can be effected by means of an executable computer routine, the digital function blocks are selected on the basis of the input digital parameters, whereby the safety function source code is automatically generated. The function blocks themselves may be present in the form of a function block source code. The function blocks may be connected automatically in accordance with the DIN EN ISO 13849-1 standard and may jointly form a safety function source code.

The executable safety function, for example in the form of executable application software, is obtained through the compilation of the safety function source code. In the compilation of the safety function source code, instructions of the safety function source code are mapped onto instructions which, for example, are executable on the device.

The second check value is determined on the basis of the executable safety function. The second check value can be determined in a second protective layer. The second check value is used here, for example, for the automatically created software code.

Before the executable safety function is output, the first and second check values are verified in relation to a common verification criterion. If both check values satisfy the common verification criterion, the executable safety function, for example, an emergency stop, is output, i.e. provided.

According to one embodiment, the executable safety function is, however, discarded if the first check value and the second check value do not satisfy the verification criterion. Here, for example, an error message rather than the executable safety function is output.

According to one embodiment, the first check value is determined through an application of a digital check rule, in particular a determination of a cyclic redundancy or checksum, to digital parameters, in particular to digital parameters which are assigned to the respective digital function block or a combination of the digital function blocks. The first check value can preferably be generated automatically by means of an executable computer routine.

According to one embodiment, the first check value and the second check value are determined on the basis of the same digital check rule, in particular the determination of a cyclic redundancy or checksum. The use of a common verification criterion, such as, for example, the parity of the two check values, is advantageously enabled.

According to one embodiment, an executable verification function is generated in the compilation step on the basis of a digital check rule for determining the second check value.

The compilation can be effected by means of a compiler, i.e. a program translator, known per se. Check data, which provide one or more black box test specifications as test cases, can be created here according to the digital check rule. These test cases may be predefined, for example manually, specifically for each function block of the safety function. The test cases of the individual function blocks can be compiled for the entire safety function on the basis of the specification of the safety function, for example by means of the digital parameters. Checksums can be determined for each test case on the basis of these predefined test cases, wherein a checksum is an example embodiment of the second check value. In each case, a second check value can therefore be determined for each test case. The respective second check value can be verified, for example compared, with the first check value or with further check values of different protective layers according to a check rule.

According to one embodiment, the executable verification function comprises a list of executable check rules for digital parameters which are assigned to at least one selected digital function block or a combination of selected digital function blocks. The list of executable check rules may also comprise logic operations involving the function blocks and parameters or the connected actual parameters and the formal parameters.

According to one embodiment, the executable verification function is executed to determine the second check value. The black box test specification is executed here, for example by means of a processor.

According to one embodiment, the first check value and the second check value fulfill the verification criterion if the first check value and the second check value are equal or if the first check value and the second check value do not exceed a threshold value, in particular the same threshold value. The threshold value may be predefined and may differ according to the test case.

According to one embodiment, the digital parameters further comprise device parameters which specify at least one safety-related device function. The safety-related device function may specify an emergency stop or other safety-related device function according to the DIN EN ISO 13849-1 standard.

According to one embodiment, the digital parameters are read from a table, in particular from digital specifications, or from a memory in order to input the digital parameters. The digital specifications may be produced by a user by means of a software browser or editor. The digital parameters may be read automatically from the software browser or from the text editor. Here, the user may be guided in a structured manner in the production of the executable safety function, for example in a web browser.

According to one embodiment, in the digital function block assignment step, a first digital function block is selected for the input signal processing, a second digital function block is selected for the processing of output signals of the first digital function block, i.e. for the intermediate processing, and a third digital function block is selected for the generation of an output signal for the device on the basis of an output signal of the second digital function block. The architecture according to the DIN EN ISO 13849-1 standard, for example, is implemented here.

According to one embodiment, the first digital function block is provided for an evaluation of sensor signals, in particular an equivalence evaluation or antivalence evaluation of sensor signals, the second digital function block is provided for the generation of a safety action, in particular an emergency stop, a start-up lock or shutdown lock, and the third digital function block is provided for the output of a control signal to control the device according to the safety action.

According to one embodiment, a terminal connection diagram for the wiring of the device is produced in the assignment step. The input/output connections can be implemented here, for example, through software.

According to one embodiment, a terminal connection diagram for the wiring of the device is produced in the assignment step. The terminal connection diagram may indicate the external wiring of the device for the execution of the executable safety function.

According to one embodiment, further check values are determined in order to verify the executable safety function. The further check values may be determined in further protective layers, for example as explained above, and may be used for an additional comparison with the first and/or with the second check value in order to be able to implement further test cases.

According to one embodiment, the method is carried out by means of a data processing system. The data processing system may have a processor which is configured to run a computer program which carries out the steps of the method for the automatic production of the executable safety function.

According to one further aspect, the invention relates to a computer program to carry out the method for the automatic creation of an executable safety function if the computer program is run on a data processing system.

According to one further aspect, the invention relates to a device configured through programming for the automatic creation of an executable safety function for a device, with a processor which is configured to input digital parameters which specify a determined safety function, to determine a first check value on the basis of the digital parameters, to assign a number of digital function blocks from a plurality of predefined digital function blocks to the input digital parameters in order to obtain a safety function source code of the determined safety function, to compile the safety function source code in order to obtain the executable safety function, to determine a second check value on the basis of the executable safety function, and to output the executable safety function if the first check value and the second check value satisfy a verification criterion.

According to one embodiment, the processor is configured to run the computer program to carry out the method for the automatic creation of an automatic safety function.

Further features of the device configured through programming or its functionality can be derived directly from the features of the method for the automatic creation of an executable safety function.

Further example embodiments are explained with reference to the attached figures, in which.

Figure 1:
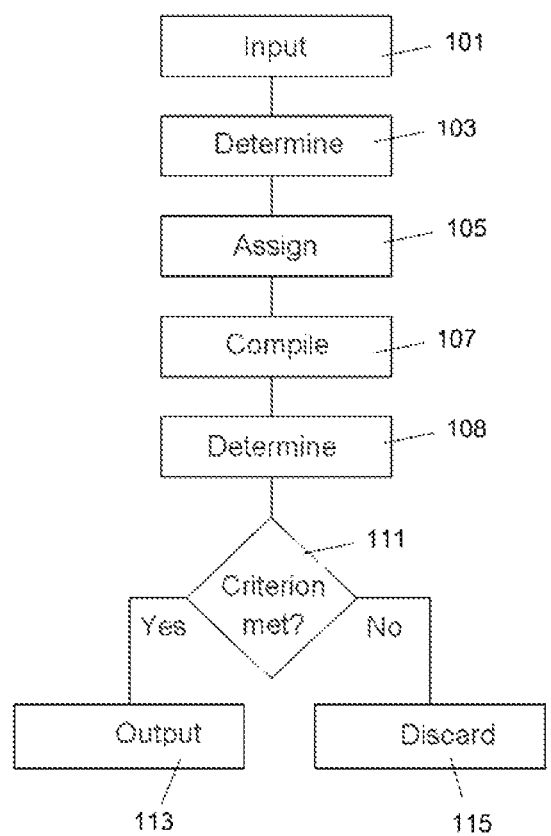
FIG. 1 shows a diagram of a method for the automatic creation of an executable safety function.

FIG. 1 shows a diagram of a method for the automatic creation of an executable safety function with input 101 of digital parameters which specify a determined safety function, determination 103 of a first check value on the basis of the digital parameters, automatic assignment 105 of a number of digital function blocks from a plurality of predefined digital function blocks to the input digital parameters in order to obtain a safety function source code of the determined safety function, compilation 107 of the safety function source code in order to obtain the executable safety function, determination 108 of a second check value on the basis of the executable safety function, verification 111 to ascertain whether the check values satisfy a verification criterion, and output 113 of the executable safety function if the first check value and the second check value satisfy a verification criterion. The method further comprises the discarding of the executable safety function if the first check value and the second check value do not satisfy the verification criterion. Following the discarding step 115, the method can be continued with one of the aforementioned steps, or, for example, an error message is output.

The first and second check values can be determined on the basis of the Cyclic Redundancy Check (CRC), wherein the verification criterion is satisfied if the first check value and the second check value are, for example, equal.

Figure 2:
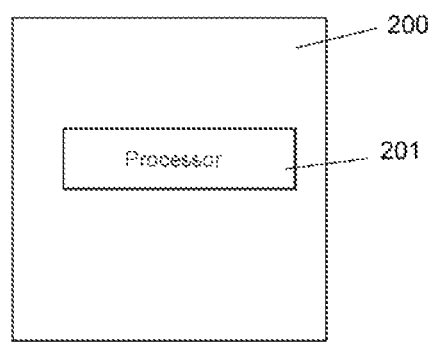
FIG. 2 shows a block diagram of a device configured through programming according to one embodiment.

FIG. 2 shows a block diagram of a device 200, configured through programming, with a processor 201 which is configured to run a computer program to carry out the method shown in FIG. 1.

Figure 3:
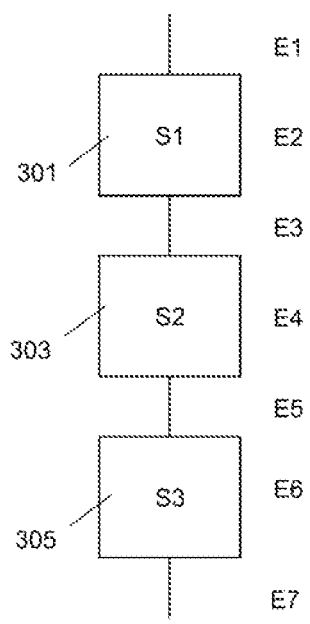
FIG. 3 shows an architecture of the security function according to one embodiment.

By means of the method shown in FIG. 1 or the device configured through programming shown in FIG. 2, the executable safety function can be created in the form of application software, the software architecture of which is determined, for example, by the DIN EN ISO 13849-1 standard and is shown in FIG. 3.

The security function comprises a first function block 301 for the input signal processing (S1), a second function block 303 for the intermediate processing (S2), which is connected downstream of the first function block 301. A third function block 305 is connected downstream of the second function block 303 for the output processing (S3). The input processing can serve to evaluate output signals from secure sensors, for example by means of an antivalence or an equivalence evaluation. The intermediate processing is provided to decouple the output of the first function block 301 from the input of the third function block 305. Here, an emergency stop function can be provided if a result of the input signal processing thus indicates. This may be the case if output signals from secure sensors are not antivalent.

The third function block 305 delivers an output signal which can be used for a corresponding safety control of a device, such as, for example, a motor. The architecture model shown in FIG. 3 can be subdivided into the elements E1-E7 in accordance with DIN EN ISO 13849-1. A check criterion in relation to specification information can be assigned for each of the elements. The check criteria reflect the properties of the function blocks 301, 303 and 305 and can be determined either externally from the data input or can be defined for the function blocks, including their parameterization, or can specify connections of the function blocks to safety functions or can specify safety-related device parameters or can specify a code simulation in order to specify a black box test case, or can indicate terminal connection diagrams.

Examples of the elements E1-E7 are given in the following Table 1.

TABLE 1

| Element | Function/details. |
| --- | --- |
| E1 | Connections to S1<br>Source/destination/data type |
| E2 | S1 from the software architecture model of DIN EN ISO 13849-1.<br>Type(FB)/links of the formal parameters to further elements |
| E3 | Connections to S2<br>Source/destination/data type |

TABLE 1-continued

| Element | Function/details. |
|---|---|
| E4 | S2 from the software architecture model of DIN EN ISO 13849-1. Type(FB)/links of the formal parameters to further elements |
| E5 | Connection S3 Source/destination/data type |
| E6 | S3 from the software architecture model of DIN EN ISO 13849-1. Type(FB)/links of the formal parameters to further elements |
| E7 | Connection of S3 to the hardware Source/destination/data type |

Figure 4:
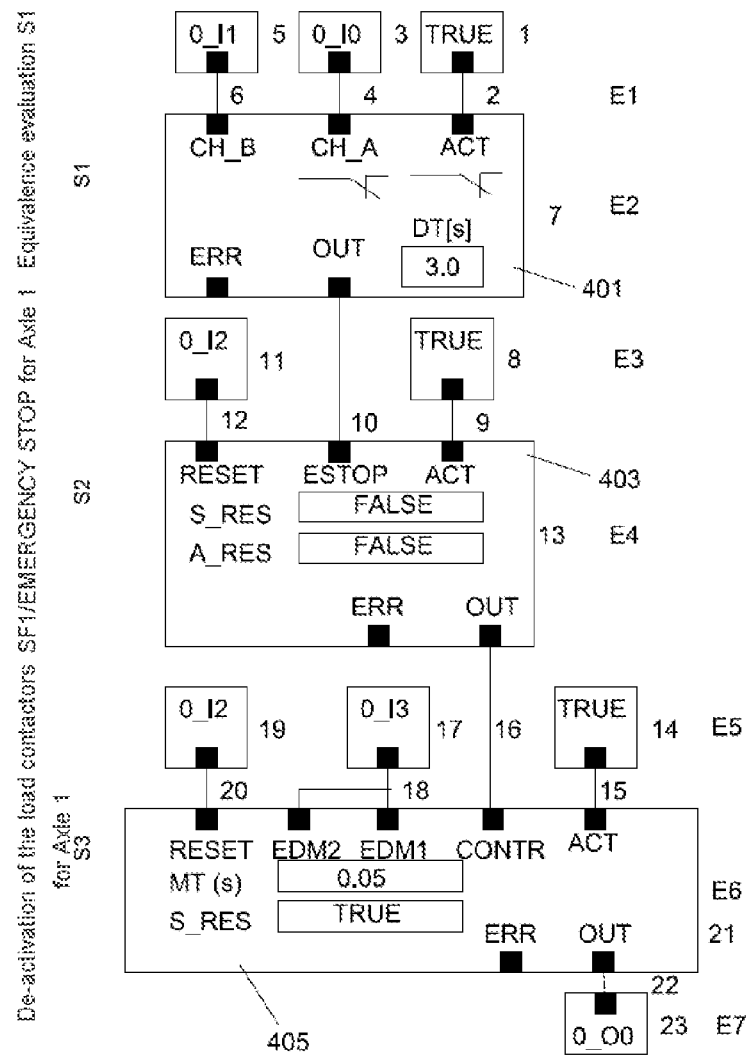
FIG. 4 shows a block diagram of a safety function according to one embodiment.

FIG. 4 shows an example of an architecture of a safety function in the context of the software architecture shown in FIG. 3. The safety function comprises a first function block 401, to which a second function block 403 is connected downstream. A third function block 405 is connected downstream of the second function block 403. The connected modules 401, 403 and 405 shown in FIG. 3 are, for example, the result of an automatic assignment of digital function blocks on the basis of electronic specifications and define the safety function source code of the executable safety function. The safety function may, for example, be an emergency stop for a first axle of a machine. Thus, the first function block 401 can carry out the input processing, in which an antivalence evaluation of the channels CH_A and CH_B is carried out. The first function block 401 may have an activation input ACT, by means of which said module can be activated. The first function block 401 further comprises an output OUT, which is connected to an ESTOP input (ESTOP: Emergency Stop) of the second function block 403.

The second function block 403 can carry out the intermediate processing and generate an emergency stop signal for an axle (axle 1) of a machine. The second function block 403 comprises an output OUT, which is connected to the input CONTR (CONTR: Control) of the third function block 405. The third function block 405 carries out the output processing and has an output OUT, via which a device, for example of the axle 1 of the machine, can be controlled. The third function block 405 may comprise an activation input ACT, via which the third function block 405 can be activated. Furthermore, parallel-connected control inputs EDM_1 and EDM_2 may be provided (EDM: External Device Monitoring). The second function block 403 and the third function block 405 may further have reset inputs for fault acknowledgement and/or cancellation of active start-up locks.

Examples of parameters for the elements E1, E3, E5 and E7 are given in Table 2.

TABLE 2

| No. | | Absolute number of the element in the graphical editor | |
|---|---|---|---|
| Source/destination | Input peripheral | 11hex | |
| | Output peripheral | 12hex | |
| | Literal TRUE | 13hex | |
| | Literal FALSE | 14hex | |
| | FB: EQ | 21hex | |
| | FB: AV | 22hex | |
| | FB: E_STOP | 41hex | |
| | FB: G_MON | 42hex | |
| | FB: EDM | 81hex | |
| | . . . | | |

TABLE 2-continued

| No. | | Absolute number of the element in the graphical editor | |
|---|---|---|---|
| Data type | BOOL | A1hex | |
| | SAFEBOOL | B1hex | |
| | BYTE | A2hex | |
| | SAFEBYTE | B2hex | |
| | WORD | A3hex | |
| | SAFEWORD | B3hex | |
| | . . . | | |
| Channel CH | CH1 | C1hex | |
| | CH2 | C2hex | |
| HW address HW-A | 0.0-255.7 | | |
| Formal parameter FP | Input parameter1 | E1hex | |
| | Input parameter1 | E2hex | |
| | . . . | | |
| | Output parameter1 | F1hex | |
| | Output parameter2 | F2hex | |
| | . . . | | |

Table 3 explains an example of the element E1.

TABLE 3

| No. | Source no. | Address | Channel | Data type | Destination/ no. | FP |
|---|---|---|---|---|---|---|
| 02 | 13 01 | — | — | A1 | 21 07 | E1 |
| 04 | 11 03 | 0 | C1 | B1 | 21 07 | E2 |
| 06 | 11 05 | 1 | C2 | B1 | 21 07 | E3 |

Table 4 explains an example of the elements E3, E5.

TABLE 4

| No. | Source/ no. | FP/ address | Channel | Data type | Destination/ no. | FP |
|---|---|---|---|---|---|---|
| 9 | 13 08 | — | — | A1 | 41 13 | E1 |
| 10 | 21 07 | F1 | — | B1 | 41 13 | E2 |
| 12 | 11 11 | 02 | — | B1 | 41 13 | E3 |

An example of the element E7 is given in Table 5.

TABLE 5

| No. | Source/ no. | FP | Data type | Destination | Address | FP |
|---|---|---|---|---|---|---|
| 22 | 41 21 | F1 | B1 | 12 | 0 | — |

Examples of criteria for the elements E2, E4 and E6 are given in Table 6. Specific check criteria may be required for each of these elements (function blocks).

TABLE 6

| No. | | Absolute number of the element in the graphical editor | |
|---|---|---|---|
| FB type | FB: EQ | 21hex | |
| | FB: AV | 22hex | |
| | FB: E_STOP | 41hex | |
| | FB: G_MON | 42hex | |
| | FB: EDM | 81hex | |
| | . . . | | |
| Formal parameter FP | Input parameter1 | E1hex | |
| | Input parameter1 | E2hex | |
| | . . . | | |
| | Output parameter1 | F1hex | |
| | Output parameter2 | F2hex | |
| | . . . | | |

TABLE 6-continued

| Source/destination | Connection of the formal parameters | |
|---|---|---|
| | BOOL | A1hex |
| | SAFEBOOL | B1hex |
| | BYTE | A2hex |
| | SAFEBYTE | B2hex |
| | WORD | A3hex |
| | SAFEWORD | B3hex |
| | Time | A3 (value in ms) |
| | ... | |

An example of the element E2 is given in Table 7.

TABLE 7

| No. | Type | FP | Data type | Destination/no. | Data type |
|---|---|---|---|---|---|
| 07 | 21 | E1 | A1 | 02 | A1 |
| 07 | 21 | E2 | B1 | 04 | B1 |
| 07 | 21 | E3 | B1 | 06 | B1 |
| 07 | 21 | E4 | A3 3000 | — | — |
| 07 | 21 | F1 | B1 | 10 | B1 |
| 07 | 21 | F2 | A1 | — | — |

An example of the element E4 is given in Table 8.

TABLE 8

| No. | Type | FP | Data type | Destination/no. | Data type |
|---|---|---|---|---|---|
| 13 | 41 | E1 | A1 | 09 | A1 |
| 13 | 41 | E2 | B1 | 10 | B1 |
| 13 | 41 | E3 | B1 | 12 | B1 |
| 13 | 41 | E4 | A1 00 | — | — |
| 13 | 41 | E5 | B1 00 | — | — |
| 13 | 41 | F1 | B1 | 16 | B1 |
| 13 | 41 | F2 | A1 | — | — |

An example of the element E6 is given in Table 9.

TABLE 9

| No. | Type | FP | Data type | Destination/no. | Data type |
|---|---|---|---|---|---|
| 21 | 81 | E1 | A1 | 15 | A1 |
| 21 | 81 | E2 | B1 | 16 | B1 |
| 21 | 81 | E3 | B1 | 18 | B1 |
| 21 | 81 | E4 | B1 | 18 | B1 |
| 21 | 81 | E5 | A1 | 20 | A1 |
| 21 | 81 | E6 | A3 50 | — | — |
| 21 | 81 | E7 | A1 01 | — | — |
| 21 | 81 | F1 | B1 | 22 | B1 |
| 21 | 81 | F2 | A1 | — | — |

The values summarized in the tables above provide digital parameters of the safety function. The digital parameters may further comprise safety-related device parameters, such as cross-circuit detection on an input 0, on the occurrence of which, for example, the procedure is carried out with test clock T0, a cross-circuit detection on the input 1, on the occurrence of which the procedure is continued with test clock T1, or with cross-circuit detections on further inputs to which, for example, no parameter values are assigned.

Examples of device-specific digital parameters are shown in Table 10.

TABLE 10

| Hardware inputs | A0 . . . n |
|---|---|
| Input parameter | With cross-circuit detection B1 |
| | Without cross-circuit detection B2 |
| Hardware outputs | C0 . . . n |
| Output parameters | ground-switching D1 |
| | non-ground-switching D2 |

Examples of parameter assignments are shown in Table 11.

TABLE 11

| A0 | B1 |
|---|---|
| A1 | B1 |
| A2 | B2 |
| A3 | B2 |
| C0 | D2 |

Examples of requirements from the specifications for the safety function shown in FIG. 4 are set out in Tables 12 to 15. The features indicated therein can always be digitally coded as digital parameters.

TABLE 12

| Name of the safety function | SF1/EMERGENCY STOP FOR Axle 1 (comment in the source code) | |
|---|---|---|
| Danger area | Axle 1 | |
| Triggering event | Actuation of the EMERGENCY STOP operating device | |
| Response | De-activation of the load contactors for Axle 1 | |
| Safe condition | Axle 1 is stopped | |
| Operating modes | Automatic | |
| Required response time of the control system | 200 ms (specific safety-related device parameter) | |
| Interfaces to other machine functions | — | |
| Interfaces to other safety functions | — (or graphical link to other safety functions) | |
| Behavior in the event of a fault | — | |
| | | Yes/No |
| Necessary start-up blocks | Start-up block after start | ☒/☐ |
| | Start-up block after withdrawal of the safety requirement | ☒/☐ |
| | Start-up block after acknowledgement of a device fault | ☐/☒ |
| | Start-up blocks are not required | ☐/☒ |
| | Specifications for the S_RES and A_RES on the FBs | |
| | | Yes/No |
| Implementation of the start-up blocks | Start-up block in the sensor logic | ☐/☒ |
| | Start-up block in the control logic (program) | ☒/☐ |
| | Start-up block in the actuator logic | ☐/☒ |
| | Specifications for the S_RES and A_RES on the FBs | |
| | | Yes/No |
| Quality of the reset signal | Standard signal (without processing in the standard logic) | ☐/☒ |
| | Secure signal (single-channel) | ☒/☐ |
| | Secure signal (two-channel) | ☐/☒ |

TABLE 12-continued

| Name of the safety function | SF1/EMERGENCY STOP FOR Axle 1 (comment in the source code) |
|---|---|
| Connection of the reset signal | O_I3 (specification for the HW connection in the software) |
| Necessary safety integrity of the reset function | PLr = a (specifications for the structure/single-channel or two-channel and for device parameters) => single-channel input without cross-circuit monitoring. |
| Test devices | — |
| Necessary safety integrity SIL/PL of the safety function | PLr = d (specifications for the structure/single-channel or two-channel and for device parameters) => two-channel input without cross-circuit monitoring in the input circuit. |

The expressions in brackets in the following tables are provided only to explain the preceding text.

TABLE 13

| S1 | Specification |
|---|---|
| Function | Equivalence evaluation S1 |
| Name of instance | Equivalent (FB to be used) |
| Connection of the input parameters | ACT = TRUE (statistical module activation) CH_A = O_I0 (parameters are shown after instance in the input) CH_B = O_I1 (Specification for the HW connection in the software) |
| Connection of the output parameters | OUT = S2 Emergency Stop ESTOP (Specification for the HW connection in the software) |
| Non-connected parameters | Error (Specification for the HW connection in the software) |
| Times (optional) | DT 1000 ms |

TABLE 14

| S2 | Specification |
|---|---|
| Function | EMERGENCY STOP |
| Name of instance | Emergency Stop |
| Connection of the input parameters | ACT = TRUE (statistical module activation) ESTOP = S1 OUT (parameters are shown after instance) RESET = O_I2 S_RES and A_RES are derived from the functional description table. |
| Connection of the output parameters | OUT = S3 EDM CONTR |
| Non-connected parameters | Error |
| Times (optional) | — |

TABLE 15

| S3 | Specification |
|---|---|
| Function | Contactor control |
| Name of instance | EDM |
| Connection of the input parameters | ACT = TRUE (statistical module activation) CONTR = S2 OUT (parameters are shown after instance) EDM_1 = O_I3 EDM_2 = O_I3 RESET = O_I2 MT = 500 ms S_RES is derived from the functional description table. |
| Connection of the output parameters | OUT = 0_O0 |
| Non-connected parameters | Error |
| Times (optional) | — |

From the specification information, which is available in electronic form and provides digital parameters, and also from, for example, predefined check criteria, such as the CRC generation, checklists can be generated for the first protective layer in which, for example, the first check value is generated. Hereafter, on the basis of the specification information, a code generator can generate the safety function source code which, for example, may comprise settings on the function blocks 401, 403 and 405 and some or all of the connections shown in FIG. 4.

The safety function source code shown in FIG. 4 is compiled, for example, by means of a compiler. The compiler can create checklists for all function blocks, i.e. elements and sub-elements, from the safety function source code, which can be presented in an editor, whereby a second protective layer is generated, in which, for example, the second digital check value is determined. The generated criteria, i.e. check values, of the first and the second protective layers are compared with one another. If the check values, which are available, for example, as data, are identical, it is ensured that the safety function source code meets the requirements of the specifications. The safety function source code is thus verified. If the check values are different, the safety function source code cannot then be verified and output or released. In this way, an automatic transfer of the specification data can advantageously take place to the automatically created source code for safety-related application software which, for example, implements the executable safety function. In this way, the specifications standardized in the context menus of a specification document can be mapped, enabling an automatic generation of safety-related software for machinery and installations.

According to one embodiment, the method for the automatic creation of the executable safety function can be subdivided into the following sub-steps P1 to P7.

In sub-step P1, a software architecture model can be defined in accordance with the DIN EN ISO 13849-1 standard along with the specifications. This produces, for example, the architecture of the executable safety function shown in FIG. 3.

In sub-step P2, the verification of the specifications of the safety function is carried out. The specifications can be verified and released by the user employing the inputs of the context menus in the form of a white box test.

The verification of the specifications can be supported by the software interface through checkpoints, release fields, etc. This verification can also be documented in the software interface.

The safety function source code is automatically created in sub-step P3. According to the linear representation of the architecture model of DIN EN ISO 13849-1, the individual function blocks of the safety function can be interconnected and parameterized by means of the software interface. The type of the function blocks, their settings and connections to complete safety functions are derived from the details of the context menus, i.e. from the digital specification information.

A detail in the context menu describes, for example, a property in relation to the software, the type of the relevant function block, formal parameter settings of the function block, and connections to the hardware and to further function blocks in the signal chain S1 to S3 shown in FIG. 3.

The code can also be automatically annotated, so that a standard-compliant source code is produced. The annotation is derived from the details of the context menus, i.e. from the digital specification information.

The software connection to the hardware and to further safety functions can be set up through the programming interface. The connection is produced from the information in the context menus, i.e. from the specification information.

Furthermore, the safety-related device parameters of the secure inputs and outputs can be automatically defined according to the details of the specification. The values of the safety-related device parameters are derived, for example, from the detail of the safety integrity of the context menus.

In addition, the user of the secure programming interface can obtain information on how the sensors and actuators must be connected to the hardware so that the necessary safety integrity is achieved. For this purpose, for example, created, checked and released circuit examples serve as a graphical presentation in the secure software interface. The user thus obtains the software project derived from the specification with annotation, device parameters set in relation to the necessary safety integrity and all information in order to be able to ensure the safety integrity of his application.

The safety function source code is verified in sub-step P4. The automatic creation of the source code and the device parameters are qualified here to the extent that a verification by the user is not required. The qualification process can take place in the form of a CRC check or through other safeguards. A checksum is formed here on the basis of the information from the context menus. This checksum should match the checksum generated by the compilers of the secure programming interface. A check is also carried out by the programming interface to ascertain, for example, whether the response time of the control system has been adhered to or exceeded.

A black box test specification is created in sub-step P5. The black box test specification is automatically created by the programming interface, for example in the form of a list, on the basis of a requirements description of the individual safety functions and their digital specification. This list is created on the basis of predefined test cases for each safety function. The safety functions involved are identified from the definitions in the context menus, i.e. specification information. Complete standardized test case descriptions are possible with this measure. This may involve a linking of the information from the context menus to the created, checked and released lists of standardized test case descriptions. The selection of the test cases is created depending on the necessary safety integrity of the safety function. Furthermore, the type of the safety function and the combination of the function blocks, the parameter values and the device parameters, for example automatically set, can be decisive for the automatic compilation of the test cases. The result is the automatically created black box test specification for programmed safety functions.

The black box test specification is verified in sub-step P6. A verification by the user is not required due to the qualified automatic creation of the black box test specification. Further qualification measures are described in the aforementioned DIN EN ISO 13849-1 standard which in this respect is included in the disclosure.

The safety-related application software which implements the executable safety function is verified in sub-step P7. Here, the user can carry out the validation of the safety-related application software in the form of a function test on the basis of the automatically created black box test specification and can document the test results.

Figure 5A:
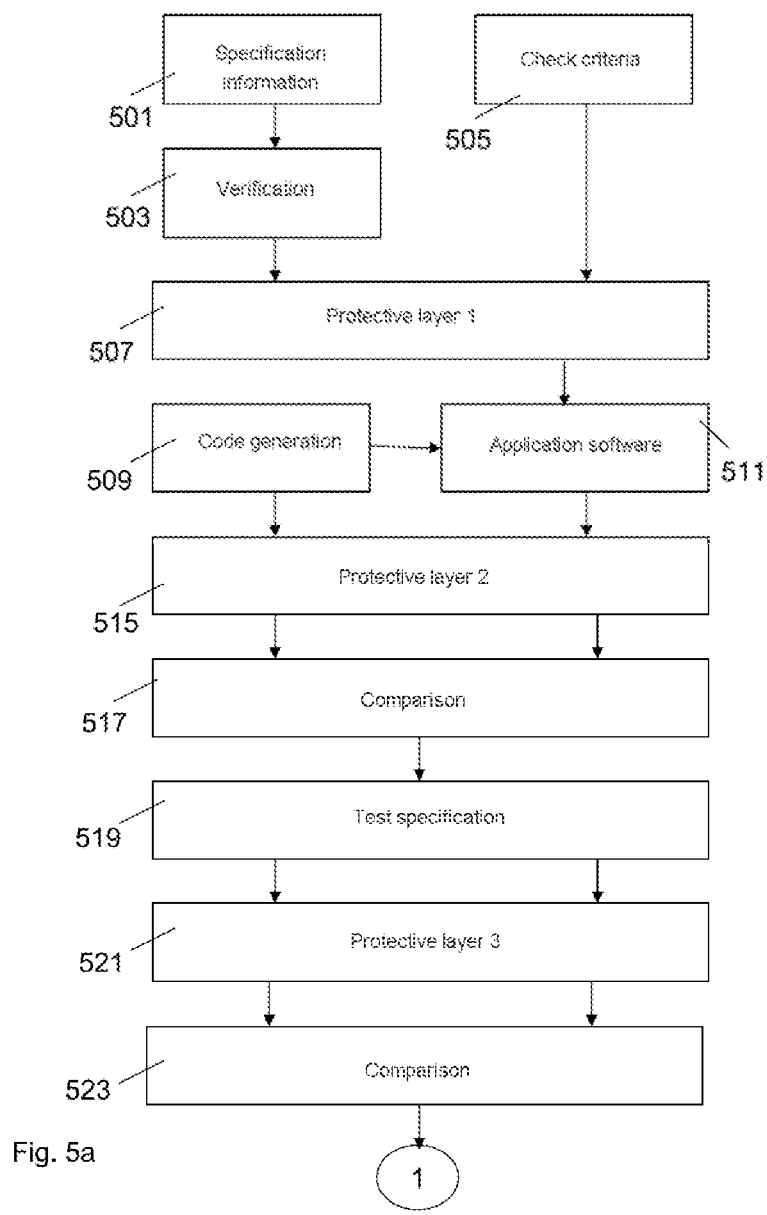
FIGS. 5a, 5b, 5c show a diagram of a method for the automatic generation of an executable safety function according to one embodiment.
Figure 5B:
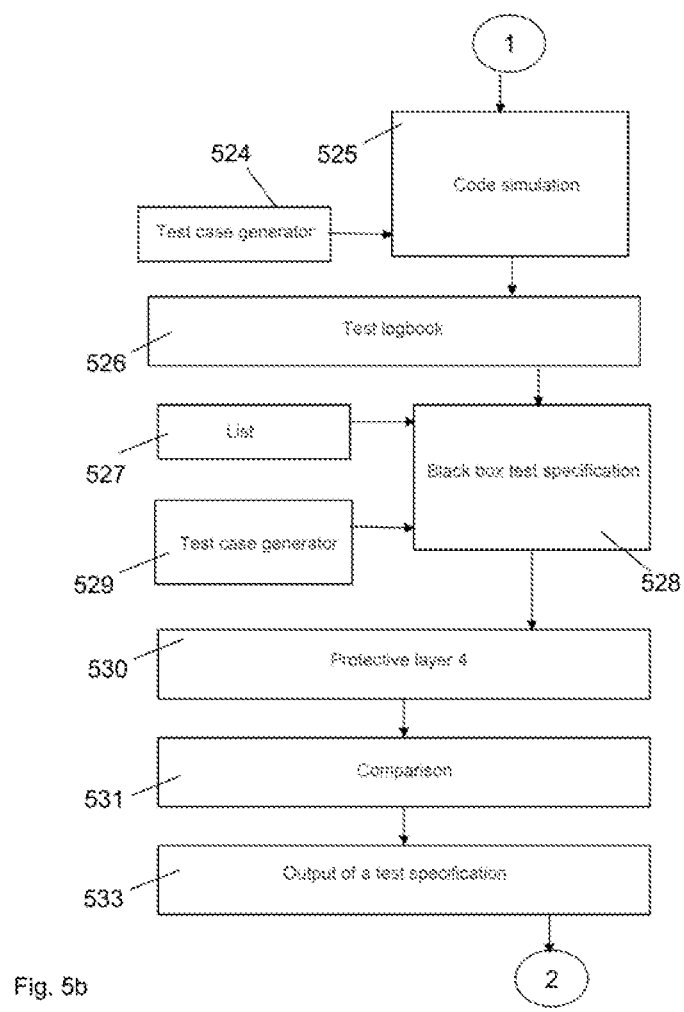
Figure 5C:
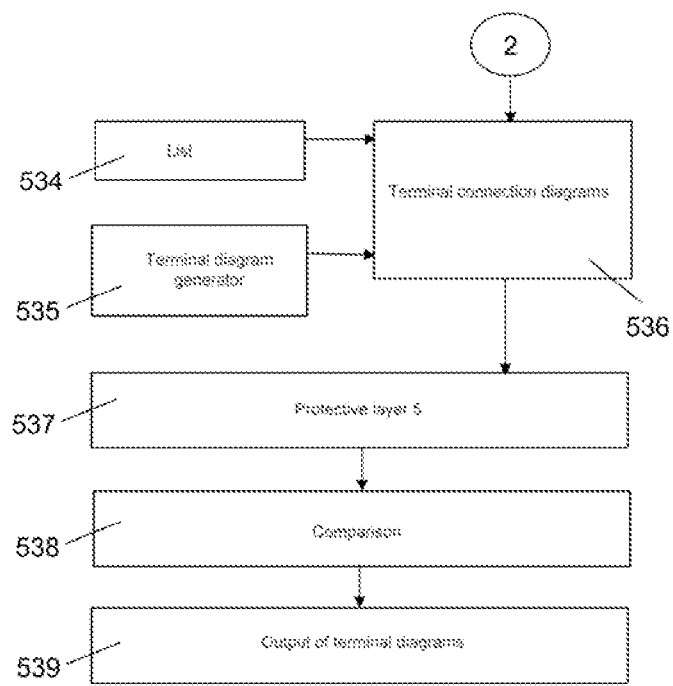

FIGS. 5a, 5b and 5c show a diagram of a method for the automatic production of an executable safety function according to one embodiment. In step 501, the specification information is entered, for example by a user via software and independently from any code generator. In step 503, the specification information or its specifications are verified by the user. The verification can be carried out on the basis of test points, which may be provided in the form of a checklist.

In a further step 505, defined test criteria, determined independently or externally from a data input, can be defined, for example in parallel with steps 501, 503, for the function blocks, which may be provided from software modules, including their parameterization, connection of the function blocks to safety functions, safety-related device parameters, a specification of the code simulation, a specification of the black box test cases or terminal connection diagrams.

Steps 501 and/or 505 supply digital parameters which specify the safety function. These digital parameters are brought together in step 507. Step 507 can implement a first protective layer, the result of which is a first digital check value. Checksums or other software-protecting mechanisms can be formed here for all safety functions defined in the specifications, including all safety-related device parameters for achieving the safety functions for safety-related application software, including all parameters, the test specification for the code simulation, the black box test specification or the terminal connection diagrams.

Hereafter, a safety function source code of the safety function is created and compiled. To do this, in step 509, using a secure programming interface and/or a hardware configuration tool and/or a code generator and/or a parameter generator, the safety-related application software which implements the executable safety function can be automatically created and made available in step 511. The set safety-related device parameters can be taken into account here. The programming and setting of the device parameters by a user are thus no longer required. Through the compilation of the safety function source code, created, for example, by means of a code generator, the executable safety function is produced, which is subsequently verified in step 515, which maps a second protective layer. A second digital check value is generated here. In step 515, checksums or other software-protecting mechanisms are formed for the automatically created safety-related application software, which represents the executable safety function as an example, including all safety-related device parameters for achieving a safety integrity.

In the following step 517, the results of the first and the second protective layer are compared. The checksums are compared here, for example, in relation to a verification criterion. The verification criterion can specify that the two checksums must be equal in order to ensure that the independent software elements have arrived at the same result on the basis of the specification information. A verification of the safety function source code by the user is therefore no longer required. The executable safety function can be provided hereafter.

The following steps are optional:

An automatic test specification for a code simulation can be created in step 519. In this way, the creation of the test specification by a user is no longer required.

In a further step 521, in which a third protective layer is implemented, a further digital check value can be formed, for example through the formation of checksums or through other software-protecting mechanisms for the sub-specification of the code simulation.

In a further step 523, the results, i.e. the digital check values, of the first protective layer 507 and the third protective layer 521 can be compared, for example by means of the aforementioned verification criterion. Here, the check values, for example checksums, should be equal, so that it is ensured that the independent software elements have arrived at the same result on the basis of the specification information. A verification of the test specification for the code simulation by the user is therefore no longer required.

In a further, optional step 524, the code simulation 525 can be automatically carried out in a secure programming interface by means of a software simulator or test case generator. The simulation of the software by the user is therefore no longer required.

In a further step 526, an automatic creation of a test logbook for the code simulation can be carried out.

In a further step 527, lists of black box test cases can be predefined for the safety functions, for example specifically in relation to safety integrity. In step 528, black box test specifications can be automatically created using a black box test case generator 529 for the individual safety functions on the basis of the specification information.

In a following step 530, in which a fourth protective layer is implemented, a further digital check value can be formed in a further, fourth protective layer through, for example, a formation of checksums or through other software-related safety mechanisms for the black box test specification.

In a following step 531, the digital check values of the first protective layer 507 and the fourth protective layer 530 are compared with one another. Here, the two check values, for example checksums, must be equal, so that it is ensured that the independent software elements, i.e. function blocks, have arrived at the same result on the basis of the specification information. A verification of the test specification by the user is therefore no longer required.

In a further, optional step 533, the black box test specification is output, for example in the form of a checklist, including a test procedure specification.

In a further step, connection diagrams can be automatically created, for example for sensors and actuators for the individual safety functions on the basis of the specification information. Here, in step 534, checked lists of connection examples, for example, can be provided for the safety functions, specifically in relation to safety integrity, and, in step 535, a terminal and connection diagram generator can be used. The connection diagrams are provided in step 536.

In a following step 537, in which a fifth protective layer is implemented, a further digital check value can be determined in a fifth protective layer. Here, checksums or other software-protecting mechanisms can be formed for the black box test specification.

In a further, optional step 538, the digital check values of the first protective layer 507 and the fifth protective layer 537 are compared. A check is carried out here to ascertain whether the two check values, which, for example, may be checksums, are equal. If the two check values are equal, it is thus ensured that the independent software elements have arrived at the same result on the basis of the specification information. A verification of the terminal connection diagrams by the user is therefore no longer required.

The terminal connection diagrams can be output in a further step 539. Here, an assignment of the terminals to the sensors and actuators to the individual safety functions can be output.

The secure programming interface, the code generator for creating the safety-related application software, the test case generators, the hardware configurator, the comprehensive list of black box test cases, the list of test cases for the code simulation and the assignment of the terminal points are, for example, software modules independent from one another which are individually developed, tested and released. The checksums of the individual protective layers are created in different ways, and are preferably identical in the result to the first protective layer 507.

Figure 6:
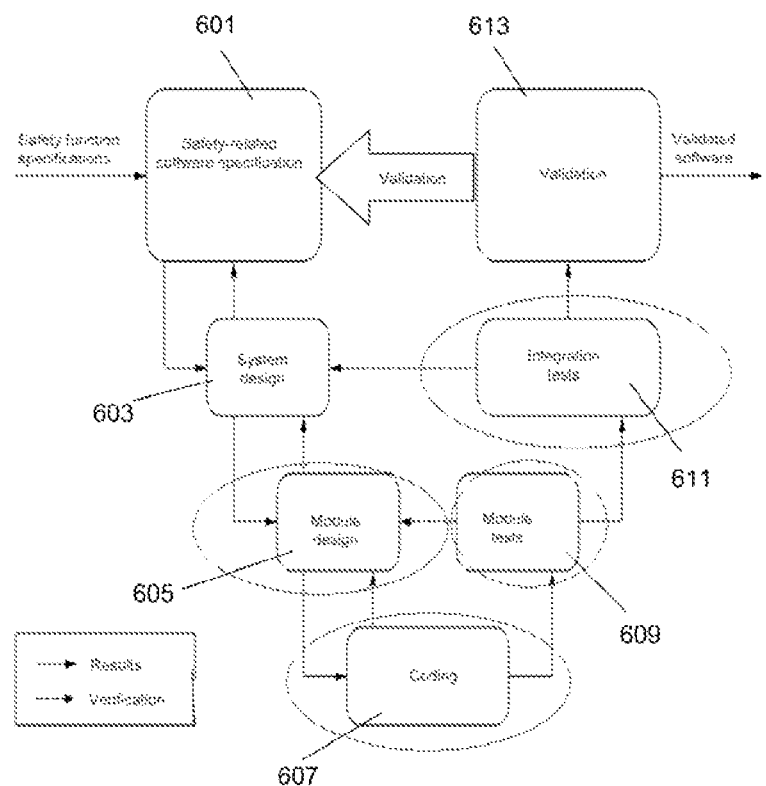
FIG. 6 shows a software development diagram.

FIG. 6 shows a model of the software lifecycle according to the DIN EN ISO 13849-1 standard. The software lifecycle comprises the safety-related software specifications 601, the system design 603, the module design 605, the coding 607, module tests 609, integration tests 611 and the validation 613. Steps 601 to 613 must normally be carried out manually and organizationally by a user. This is associated with a considerable outlay in terms of time and resources. Furthermore, systematic errors can occur in the development process.

The automatic generation of the executable safety function described above enables the automatic performance of steps 605, 607, 609 and 611 on the basis of individual, independent software modules. Here, along with the automatic performance of the safety mechanisms, the automatic verification of the individual work steps is also enabled. In this way, systematic errors are counteracted. The implementation of the application software which implements the executable safety function is thereby also speeded up. In addition, fewer programming resources and verification resources, as well as the resources for producing, checking and releasing the individual work steps, are required.

Through the automatic creation of the safety function, the development process for safety-related application software becomes simpler, shorter, faster and more economical for the user. Furthermore, systematic and safety-critical errors are advantageously avoided through automatic creation of the source code. The safety-related device parameters are set automatically for each safety function on the basis of the specification details in relation to the necessary safety integrity. To do this, the user no longer has to derive, set and verify these data from user documentation. This results in a further error avoidance, in a resource saving and in a time saving. In addition, filter times and watchdog times can be set automatically for each safety function on the basis of the specification details in relation to the necessary response time. The user therefore no longer has to determine these data arithmetically, predefine them in the hardware configuration and verify them. The user of the programmable or parameterizable security function furthermore requires no knowledge to predefine the safety-related device parameters. The user can therefore restrict himself to the specification of the safety functions only, and no longer has to program their software implementation, as a result of which further error sources are eliminated. The user no longer has to verify the created safety function, since the verification is automatically integrated into the software design process.

The user can be guided by a programming interface through a standard-compliant safety-related software development process with no need for programming. Despite the automatic code creation, the user can obtain a structured and annotated source code which can be diagnosed during servicing (debug). Through the invention, the user therefore automatically adheres to the process for the creation of safety-related application software following completion of the verification of the specifications. The user therefore automatically obtains a part of the documentary evidence with which he can establish conformity with the harmonized sector standards for functional safety and therefore with the Machinery Directive.

The user of the programming interface can therefore be guided through the development process in order to obtain the safety function. He obtains a tool with which the requirements of the harmonized standards can be met by automatically implementing and verifying activities. On the basis of the specification P1 and P2 and P3 to P6, the safety-related application software which implements the safety function is automatically created by the secure programming environment. On the basis of the specification P1 and P2, the validation measures are automatically created for safety functions in the form of a black box test specification. During the data input, an end-to-end data security mechanism can be generated on the basis of checked data. The checksums generated during the input, which form digital check values, should also be attained by all further software modules so that the application software can be verified. These protective layers implement the automatic verification of the work steps and the automatically created work results. Nevertheless, a normatively structured and annotated secure source code of the safety-related application software is generated which can be analyzed in the debug mode of a secure programming system. This is particularly advantageous for the servicing of machinery.

REFERENCE NUMBER LIST

Input of digital parameters 101
Determination of a first check value 103
automatic assignment of function blocks 105
Compilation of the safety function source code 107
Determination of a second check value 108
Verification of a verification criterion 111
Output of the safety function 113
Discarding 115
Device 200
Processor 201
Function block 301
Function block 303
Function block 305
first function block 401
second function block 403
third function block 405
Method steps 501-539
Software specification 601
System design 603
Module design 605
Coding 607
Module tests 609
Integration tests 611
Validation 613

The invention claimed is:

1. A method of automatic creation of an executable safety function for a device, the method comprising the steps of:
inputting digital parameters which specify a determined safety function, the digital parameters comprising device parameters which specify at least one safety-related device function and wherein the step of inputting the digital parameters comprises reading the digital parameters from a table or memory containing digital specifications;
determining a first check value based on the input digital parameters;
automatically assigning a number of digital function blocks from a plurality of predefined digital function blocks to the input digital parameters to obtain a safety function source code of the determined safety function;
compiling the safety function source code to obtain the executable safety function;
determining a second check value based on the executable safety function; and
outputting the executable safety function if the first check value and the second check value meet a verification criterion;
wherein the step of automatically assigning comprises selecting a first digital function block to process input signals, selecting a second digital function block to process output signals of the first digital function block, and selecting a third digital function block to generate an output signal for the device based on an output signal of the second digital function block; and
wherein the first digital function block is configured to evaluate input signals, in particular to perform an equivalence evaluation or antivalence evaluation of sensor signals, wherein the second digital function block is configured to generate a safety action, in particular an emergency stop, a start-up lock, or a shutdown lock, and wherein the third digital function block is configured to output a control signal to control the device according to the safety action.

2. The method of claim 1, wherein the executable safety function is discarded if the first check value and the second check value do not satisfy the verification criterion.

3. The method of claim 2, wherein the first check value is determined through an application of a digital check rule, the digital check rule including determination of a cyclic redundancy or a checksum to digital parameters, the digital parameters being assigned to the respective digital function block or to a combination of the digital function blocks.

4. The method of claim 3, wherein the first check value and the second check value are determined based on the same digital check rule, in particular the determination of a cyclic redundancy or checksum.

5. The method of claim 1, wherein an executable verification function is generated in the compiling step based on a digital check rule for determining the second check value.

6. The method of claim 5, wherein the executable verification function comprises a list of executable check rules for digital parameters which are assigned to at least one selected digital function block or to a combination of selected digital function blocks.

7. The method of claim 5, further comprising using the executable verification function to determine the second check value.

8. The method of claim 1, wherein the first check value and the second check value fulfill the verification criterion if the first check value and the second check value are equal, or wherein the first check value and the second check value fulfill the verification criterion if the first check value and the second check value do not exceed a threshold value, or wherein if the first and second check values must be different because of diverse processing, the verification criterion must in every case be unique.

9. The method of claim 1, wherein the step of automatically assigning further comprises automatically interconnecting or parameterizing the selected digital function blocks according to the digital parameters.

10. The method of claim 1, wherein the step of automatically assigning comprises generating a terminal connection diagram describing wiring of the device.

11. The method of claim 1, further comprising determining further check values to verify the executable safety function.

12. The method of claim 1, which is carried out by means of a data processing system.

13. A non-transitory tangible computer readable medium containing a computer program which, when loaded into a processor of a computer system, is configured to implement the method of claim 1.

14. An apparatus, comprising:
a computer processor; and
a non-transitory tangible computer readable storage medium having stored thereon a computer program for implementing a program for automatic creation of an executable safety function for a device, the computer program comprising a set of instructions which, when executed by the computer processor, cause the computer processor:

to input digital parameters which specify a determined safety function, the digital parameters comprising device parameters which specify at least one safety-related device function and wherein the step of inputting the digital parameters comprises reading the digital parameters from a table or memory containing digital specification;

to determine a first check value based on the input digital parameters;

to automatically assign a number of digital function blocks from a plurality of predefined digital function blocks to the input digital parameters to obtain a safety function source code of the determined safety function;

to compile the safety function source code to obtain the executable safety function;

to determine a second check value based on the executable safety function; and to output the executable safety function if the first check value and the second check value meet a verification criterion;

wherein the set of instructions that automatically assign a number of digital function blocks cause the computer processor to select a first digital function block to process input signals, select a second digital function block to process output signals of the first digital function block, and select a third digital function block to generate an output signal for the device based on an output signal of the second digital function block; and wherein the first digital function block is configured to evaluate input signals, in particular to perform an equivalence evaluation or antivalence evaluation of sensor signals, wherein the second digital function block is configured to generate a safety action, in particular an emergency stop, a start-up lock, or a shutdown lock, and wherein the third digital function block is configured to output a control signal to control the device according to the safety action.

* * * * *